Feb. 23, 1960 A. D. ALEXANDER 2,926,216

MULTIPLE PULSE COMMUNICATION SYSTEM

Filed Oct. 26, 1956 5 Sheets-Sheet 1

INVENTOR.
ARTHUR D. ALEXANDER,

BY

McMorrow, Berman + Davidson
ATTORNEYS.

INVENTOR.
ARTHUR D. ALEXANDER,
BY
McMorrow, Berman & Davidson
ATTORNEYS.

INVENTOR.
ARTHUR D. ALEXANDER,
BY
McMorrow, Berman & Davidson
ATTORNEYS.

INVENTOR.
ARTHUR D. ALEXANDER,
BY
McMorrow, Berman + Davidson
ATTORNEYS.

Feb. 23, 1960 A. D. ALEXANDER 2,926,216

MULTIPLE PULSE COMMUNICATION SYSTEM

Filed Oct. 26, 1956 5 Sheets-Sheet 5

INVENTOR.
ARTHUR D. ALEXANDER,
BY
McMorrow, Berman + Davidson
ATTORNEYS.

United States Patent Office 2,926,216

Patented Feb. 23, 1960

2,926,216

MULTIPLE PULSE COMMUNICATION SYSTEM

Arthur D. Alexander, Detroit, Mich.

Application October 26, 1956, Serial No. 618,500

12 Claims. (Cl. 178—23)

This invention relates to systems of communication, and more particularly to a new and improved teletypewriter system employing groups of electrical pulses to represent the characters to be transmitted, each group of pulses comprising a series of pulses progressively increasing in magnitude but being arranged in polarity in a different manner for each character transmitted.

A main object of the invention is to provide a novel and improved teletypewriter system which involves relatively simple components, which requires no motor, and which tolerates a much greater amount of distortion due to line characteristics or other causes than in systems previously employed in the art.

A further object of the invention is to provide an improved teletypewriter system wherein the receiver will properly select a transmitted signal and perform its function without requiring the use of a motor, wherein no more than five impulses are required for the transmission and selection of any character, and wherein proper selection of a transmitted signal does not depend upon the time duration between the impulses.

A still further object of the invention is to provide an improved teletypewriter system wherein a series of electrical pulses is employed to transmit each character, the receiver being arranged to respond to the arrangement of the pulses to organize the receiver to print the character associated with the pulses automatically when the last pulse in the series has been received, the receiver being further arranged to restore the parts thereof to normal released positions as soon as the received character has been printed.

A still further object of the invention is to provide an improved method of electrical communication wherein characters to be transmitted are repreesnted by a series of electrical pulses progressively increasing in magnitude but having different polarity arrangements, and wherein the receiving apparatus has respective circuits responsive to the respective successive pulses, said circuits being immune to pulses of smaller magnitude than their intended pulses and being rendered immune to pulses of larger magnitude after they have been activated by said intended pulses.

Further objects and advantages of the invention will become apparent from the following description and claims, and from the accompanying drawings, wherein:

A prime purpose of the present invention is to provide a novel and improved system to automatically and independently control several different members from a remote point by the use of grops of coded pulses. As applied to communication, this system is particularly useful in telegraphy systems involving the conversion of the individual characters of a next message into groups of coded pulses, transmitting these pulses to a receiving and decoding device having automatic selecting means arranged to respond to said groups of coded pulses to organize the receiver to print the character associated with the pulses, and restore the parts thereof to normal released positions as soon as the received character has been printed, wherein messages may be transmitted in direct written form. This system is also applicable to automatic switching systems in which groups of coded pulses are used to control members which may in turn actuate other members or electrical circuits.

The communication system of the present invention utilizes a novel type of signal for transmission of the characters, and further utilizes a novel principle for the selection of the characters by the receiving apparatus associated with the system. The type of signal utilized in the system of this invention may be termed a "differentiated-polar signal." This signal is received by and operates on a receiver mechanism through the use of suitable relay circuits and electromagnets controlled by said circuits, to set up organizations of the elements of the receiver associated with the characters transmitted, such that printing of the selected characers may be accomplished.

Figure 13:
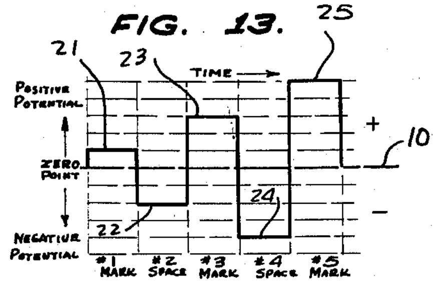
Figure 13 is a graphical representation illustrating a typical series of pulses employed to transmit a character, in accordance with the communication system of the present invention.
Figures 2, 10, 11:
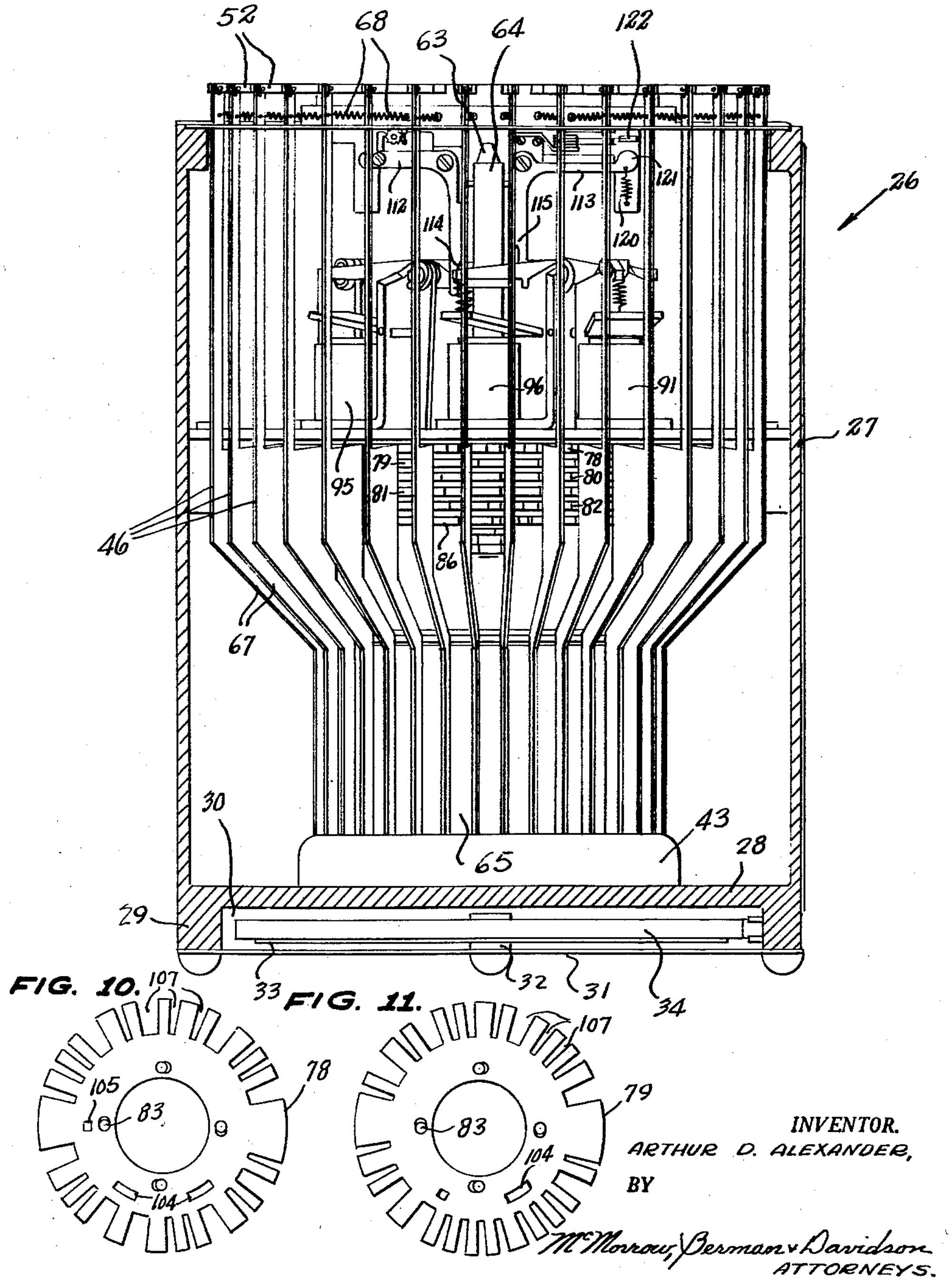
Figure 2 is a vertical cross sectional view taken diametrically through the housing of the receiver of Figure 1, showing the mechanical parts of the receiver in elevation.
Figure 10 is a plan view of the fourth disc member employed in the receiver of Figures 1 to 6.
Figure 11 is a plan view of the fifth disc member employed in the receiver of Figures 1 to 6.

The "differentiated-polar signal" utilized in the system of this invention is a polar type of signal comprising a series of impulses wherein each impulse has a different magnitude, and wherein, for example, the successive impulses are of increasing magnitude. For example, the series of impulses may comprise five pulses of successively increasing magnitude but having an arrangement of polarities which is unique with respect to each character to be transmitted. For example, as shown in Figure 13, the first pulse in the series, represented by the reference numeral 21, may be either positive or negative, corresponding to a "mark" or "space," and in the case illustrated is positive in polarity. As shown, the first pulse is of specific magnitude, comprising one unit of potential. The second pulse, shown at 22, is twice the magnitude of the first pulse and may be either positive or negative, being negative in the illustrative example shown in Figure 13. The second pulse 22 is greater than the first pulse 21, but is not necessarily twice the magnitude of the first pulse, being merely shown as twice the magnitude for purposes of convenience in illustration.

The third pulse, shown at 23, is greater than the second pulse 22 and may be either positive or negative in polarity, being shown positive in the typical example illustrated in Figure 13. The magnitude of the third pulse 23 need not be a multiple of the magnitude of the first pulse 21, but is shown as three times the magnitude of pulse 21 for convenience in illustration.

The fourth pulse, shown at 24, may be either positive or negative but must have a magnitude greater than the third pulse 23. In the illustrative example shown in Figure 3 the fourth pulse is shown as negative and is further shown as having a magnitude four times that of the first pulse 21, for convenience in illustration.

The fifth pulse, shown at 25, is greater than the fourth pulse 24 and may have either a positive or negative polarity. In the example shown, the fifth pulse 25 has a positive polarity and is five times the magnitude of the first pulse 21.

As will be understood, a positive pulse represents a "mark" and a negative pulse represents a "space." It can be seen from Figure 13 and from the above explanation that each pulse in a particular series is greater in magnitude than the preceding pulse and has either a positive potential or a negative potential, depending on whether a mark or space is desired.

Each character to be transmitted, in the system of the present invention, requires only a series of no more than five pulses, as above explained, and the transmission of the intelligence requires no start and stop pulses to precede and end each code group, as required in the previously employed teletypewriter systems of the prior art. As will be presently apparent, five or less impulses are necessary for the transmission and selection of each code group representing a specific character or function, in the system of the present invention.

Referring now to the drawings, 26 generally designates a printing receiver employed in a communication system according to the present invention. The receiver 26 comprises a generally cylindrical housing 27 having a circular bottom wall 28 provided with a depending rim 29 defining a cylindrical space 30 below the bottom wall 28. Suitably secured to the lower portion of the depending rim 29 is a bottom cover plate 31. Centrally secured to the cover plate 31 is the upstanding pivot stud 32, and rotatably mounted on the stud 32 is a spool 33 carrying a roll of tape 34. The tape leaves the roll and passes through a guide aperture 35 and passes upwardly along the exterior surface of the housing 27 and over the top rim of the housing through a guide notch 36. The tape 34 extends through a radial guide channel 37 mounted on the top of the housing 27, is supportingly engaged by a pair of parallel arched rod elements 38, 38 mounted centrally on the top of housing 27, and is guided off the top of the housing by a channeled radial guide member 39 mounted in alignment with the radial channel 37. Between the spaced parallel arched support rods 38 and the channel 39, the tape is engaged by opposing rollers 40 and 41, the bottom roller 41 constituting a feed roller and the top roller 40 constituting a pressure roller, the roller 41 being intermittently rotated counterclockwise, as viewed in Figure 3, in a manner presently to be described, to advance the tape as each character is printed, or where a space is provided in the transmitted intelligence.

The bottom wall 28 of the housing 27 is formed with the upstanding, annular rib 43, said rib being formed with spaced slots or notches 45 in which are received the bottom ends of respective pallet arms 46, said arms being formed at their bottom ends with inwardly facing notches 47 in which is received a circular pivot ring 48 engaged in an inwardly facing annular groove 49 formed in the rib 43. Thus, the element 48 may comprise a resilient snap ring engaged in the annular channel 49 and pivotally connects the ends of the pallet arms 46 to the rib 43 in the notches 45 for rotation in respective radial planes intersecting at the axis of the cylindrical housing 27.

Figure 15:
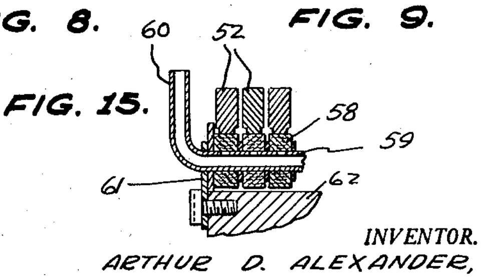
Figure 15 is an enlarged vertical cross sectional view taken substantially on the line 15—15 of Figure 3, and showing a portion of the pallet inking means employed in the receiver.

The housing 27 is provided with a top cover plate 50 which is formed with radial slots 51 through which the top portions of the respective pallet arms 46 extend. Pivoted to the top ends of the respective pallet arms 46 are the respective inwardly extending, radial pallets 52 which extend slidably between respective pairs of radially aligned vertical guide elements 53 and which are provided, with the exception of three pallets, designated at 214, 54 and 55, with respective printing embossments 56 and 57 on the bottom surfaces of their inner end portions. The extreme inner embossments 56 comprise letter characters to be printed, whereas the adjacent printing embossments 57 comprise figure, or similar characters, distinguished from letter characters, to be printed. The inner end portions of the pallets 52 are supported on inking rollers 58 rotatably mounted on apertured inking tubes 59 mounted horizontally on opposite sides of the pair of upstanding bowed supporting rods 38, 38, the inking rollers 58 being of suitable porous material through which ink may readily diffuse, and the apertured tubes 59 being provided at their ends with upstanding conduits 60 through which ink may be admitted to the tubes. Thus, as shown in Figure 15, the inking tubes 59 are supported and secured at their ends in upstanding apertured lug members 61 fastened to a subjacent block 62 secured to the housing top wall 50. The arcuate inking tubes 59 are arranged concentrically with the axis of the housing 27 and in opposing, coplanar relationship, whereby the pallets 52 are similarly supported in coplanar relationship and are movable so that their embossment elements 56 and 57 may be at times positioned directly over the axis of the housing 27 in overlying relationship to the portion of the tape supported on the spaced arched rod elements 38, 38, and whereby a corresponding character may be printed on the tape by the upward movement of a plunger element, shown at 63 against the bottom surface of the tape.

Figures 3, 12:
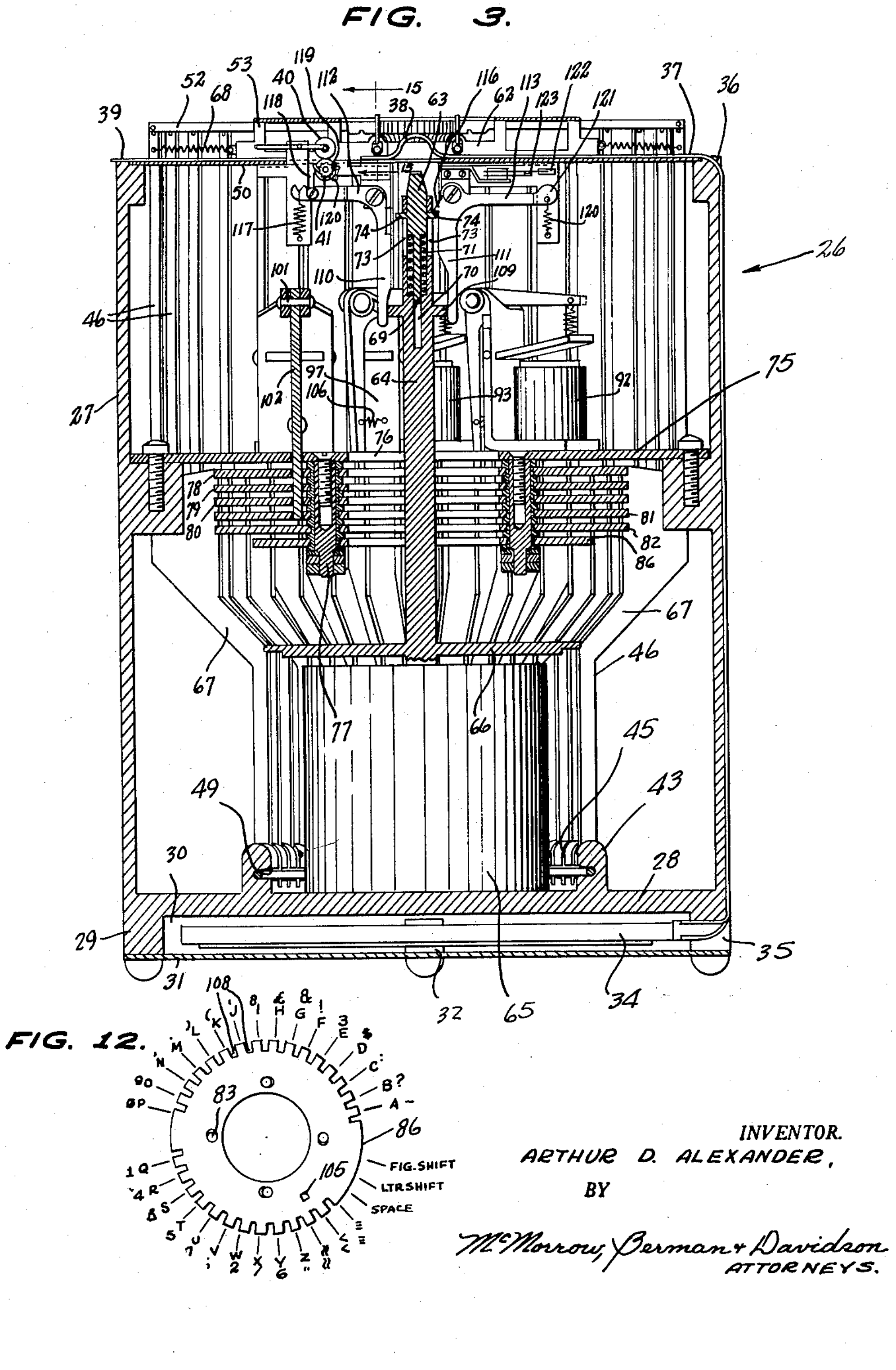
Figure 3 is a cross sectional view taken on the line 3—3 of Figure 1, showing the mechanical parts of the receiver in cross section.
Figure 12 is a plan view of the "figures shift" disc member employed in the receiver of Figures 1 to 6.

The plunger element 63 is slidably mounted for yielding vertical movement with a main plunger 64 positioned axially in housing 27, as shown in Figure 3. Plunger 64 is a vertical extension of the armature of a solenoid 65 mounted axially in the housing 27 on the bottom wall 28 thereof, the plunger 64 being formed above the solenoid 65 with the large horizontally extending circular flange 66 which is engaged at its peripheral edge by the inclined knee portions 67 of the respective pallet arms 46.

The pallet arms 46 are biased inwardly by respective coiled springs 68 connecting their upper portions to inwardly spaced portions of the block 62, whereby the inclined knee portions 67 of the pallet arms are urged continuously into engagement with the peripheral edge of the flange 66. Since the knee portions 67 are inclined downwardly and inwardly, the pallet arms 46 will be rotated inwardly by their springs 68 responsive to the elevation of the flange 66 from the normal position thereof shown in Figure 3.

As is clearly shown in Figure 3, the plunger element 63 has a depending stem portion 69 which is slidably received in a vertical bore 70 formed axially in the main plunger 64, a coiled spring 71 surrounding the stem 69 and bearing between the main plunger and the plunger element 63 to bias said element 63 upwardly. The vertical slots 73 formed in the upper portion of main plunger 64 receive respective opposing lugs 74, 74 on the plunger element 63 to guide said plunger element for vertical yielding movement with respect to the main plunger 64 and to limit the upward movement of the plunger element 63 with respect to said main plunger.

Secured horizontally in the intermediate portion of the housing 27 is an annular partition plate 75, and secured to said plate adjacent its inner aperture 76 are a plurality of depending studs 77 arranged on a common circle concentric with the axis of housing 27. Designated at 78, 79, 80, 81 and 82 are respective annular disc members of similar diameter which are rotatably supported on the depending studs 77 in spaced, parallel, coaxial relationship, and which are rotatable independently with respect to each other through a predetermined angle. Thus, each of the disc members 78 to 82 is formed with the arcuate slots 83 receiving the respective spacer collars 84 mounted on the studs 77, the spacer collars 84 being provided with spacing flanges 85 to provide the desired spacing between the disc members, and between the uppermost disc member 78 and the horizontal annular wall 75.

The arcuate slots 83 are all of identical length and permit a specified angle of rotation of each disc member, for example, an angle of approximately four degrees.

A smaller additional disc member 86 is rotatably supported on the studs 77 below the disc member 82 in the same manner as described in connection with the disc members 78 to 82, said smaller disc member 86 being formed with the arcuate slots 83 receiving the lowermost spacing washers 84 on the studs and allowing the same amount of angular movement of the disc member 86 as allowed for the larger disc members 78 to 82, namely, in the specific example described, an angle of movement of approximately four degrees.

Figure 4:
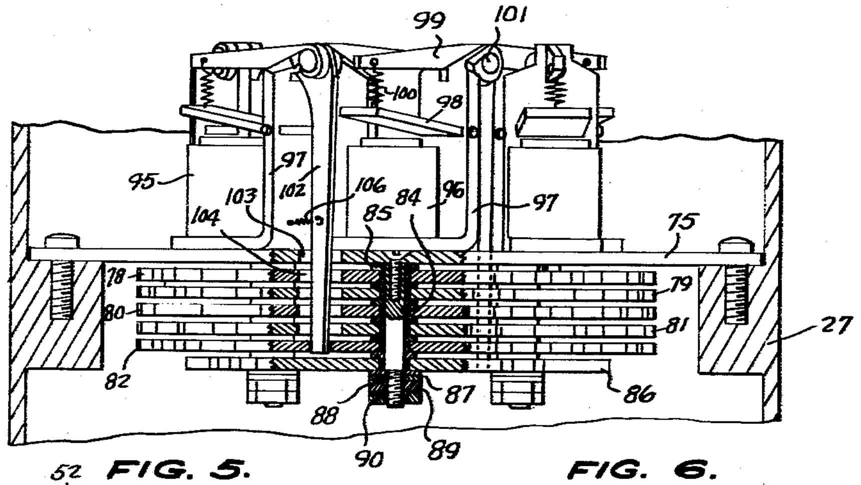
Figure 4 is an enlarged fragmentary vertical cross sectional view taken through the intermediate portion of the housing of the receiver of Figures 1 to 3 and showing the detail construction of the supporting and spacing means for the disc members of the receiver and the engagement of one of the magnetically operated disc-rotating arms with its associated disc.
Figure 5:
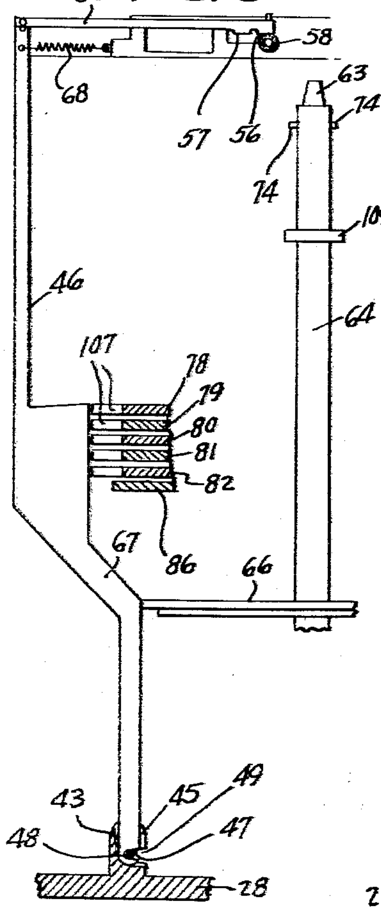
Figure 5 is a fragmentary vertical cross sectional view showing the registration of the peripheral notches in the disc members to allow one of the pivoted pallet arms to enter the registering notches, in the receiving mechanism of Figures 1 to 4, immediately prior to the printing stroke of the mechanism.

As shown in Figures 3 and 4, support washers 87 are provided on the bottom ends of the studs, said studs being suitably shouldered, as shown in Figure 4 at 88, and retaining nuts 89 are provided on the studs to engage the washers 87 against the shoulders 88, the nuts 89 being secured by lock nuts 90 provided therebelow.

Mounted on the horizontal wall 75 above the disc members and spaced at equal angles around the axis of the housing 27 and at equal radial distances from said axis are respective electromagnets 91 to 96. Each electromagnet is mounted on an L-shaped bracket 97 to the upstanding arm of which is pivoted an armature 98 connected to one end of a lever 99 by a coiled spring 100, so that the armature is biased normally upwardly, as shown in Figure 4. Each lever 99 is pivoted at its intermediate portion to the top end of the associated bracket 97, as shown at 101. The respective levers are provided with depending arms 102 which extend through slots 103 of substantial length in wall 75 and through suitable arcuate slots 104 of substantial length in the respective disc members and concentric with said disc members, except for the arm associated with the uppermost disc member 78, into engagement with an aperture 105 provided in an associated disc member. Thus, each of the disc members 78 to 82 and 86 is formed with an aperture 105 which receives the lower end of an associated arm 102, so that each disc member will be rotated independently of the other disc members responsive to the rotation of its associated lever 99. The disc members are biased toward normal positions by respective coiled springs 106 connecting the depending arms 102 to their associated brackets 97, as shown in Figures 3 and 4.

Each disc member 78 to 82 and 86 is formed at its periphery with spaced notches, the notches in the disc members being registrable under certain conditions of rotation of said disc members to allow a selected pallet arm 46 to enter the registered notches, as will be presently described.

As will be apparent from Figure 3, the pallet arms 46 are normally held away from the peripheral edges of the disc members 78 to 82 by the engagement of the flange 66 with the lower portions of the inner edges of the knee elements 67 of the pallet arms, but since the pallet arms are biased inwardly by their associated coiled springs 68, when the plunger member 64 rises, the flange 66 also rises, releasing the pallet arms 46 for inward movement. However, the pallet arms engage the edges of the disc members 78 to 82 and cannot move inwardly toward printing positions unless the associated notches on the peripheries of the disc members adjacent the respective pallet arms are in vertical registry. The notches, shown, for example, at 107 are so arranged on the respective disc members that for a given combination of conditions of rotation of the disc members, only one set of notches will be in vertical registry, whereby only one of the pallet arms 46 can be selected for inward movement toward printing position.

Thus, a pallet arm 46 may be selected by establishing a proper combination of angular movements of the disc members 78 to 82, which will in turn be the result of the energization (or deenergization) of selected electromagnets 91 to 95.

The lower disc member 86 limits inward movement of the pallet arms 46, since a selected pallet arm will be allowed to move inwardly through the vertically registering notches in the disc members 78 to 82, but will engage the edge of the disc member 86, whereby the selected pallet arm will only move inwardly toward a position wherein its letter character embossment 56 will be located above and in vertical alignment with the printing plunger element 63. To allow the numeral character embossment 57 to be positioned over the printing plunger element 63, the selected pallet arm must move inwardly still further, and therefore must enter a selected notch 108 in the "figures shift" bottom disc member 86.

As shown in Figure 12, the "figures shift" disc member 86 is provided with evenly spaced notches 108, which are rotatable into registry with all of the pallet arms 46 responsive to the rotation of the disc member 86 from its normal position toward its release position resulting from the energization of the "figures shift" electromagnet 96. Thus, if the electromagnet 96 is energized, when the flange 66 rises, the selected pallet arm 46 will move inwardly a sufficient distance so that its numeral character embossment 57 will be positioned above and in vertical alignment with the plunger element 63, whereby a numeral character will be printed rather than a letter character.

The upper portion of the plunger 64 is formed with an annular flange 109 which is normally engaged by the depending arms 110 and 111 of a pair of levers 112 and 113 pivoted to the stationary supporting block 62 on opposite sides of the plunger 64, as shown in Figure 3. The depending arms 110 and 111 have respective inclined cam edges 114 and 115 engageable by the flange 109 when the plunger member 64 rises to rotate the respective levers 112 and 113 from the normal positions thereof shown in Figure 3. Thus, as viewed in Figure 3, the upward movement of flange 109 rotates the lever 112 clockwise at a first intermediate point in the upward movement of plunger member 64, and rotates the lever 113 counter-clockwise at a later point, namely, substantially simultaneously with the printing stroke of the plunger element 63. Said plunger element 63 is restrained against upward movement until such rotation of the lever 113 by the engagement of the pin element 73 thereof with a catch lug 116 provided on the upper portion of arm 111. Thus, when the plunger 64 rises, as a result of the energization of solenoid 65, as will be presently explained, the element 63 is held until flange 109 engages the cam portion 115 of arm 111, whereby said arm 111 is rotated counter-clockwise, as viewed in Figure 3, releasing the printing plunger element 63 as the plunger member 64 reaches the end of its upward stroke.

The lever 112 is biased downwardly by a coiled spring 117 connecting the end of the lever to a subjacent point on the stationary supporting block 62, as shown in Figure 3, biasing arm 110 into engagement with flange 109. Pivoted to the lever 112 is an upwardly extending pawl 118 which engages a ratchet wheel 119 secured to the shaft of the lower tape feed roller 41, the pawl 118 being biased into engagement with the ratchet wheel 119 by suitable spring means, not shown. Also engaging the ratchet wheel 119 is a detent roller 120, said roller being resiliently supported on a suitable spring arm and engaging the periphery of the ratchet wheel to limit the stepwise movement of the ratchet wheel to a predetermined angle for each step. Each stepwise movement of the ratchet wheel is the result of a downward stroke of the pawl member 118 which is produced when the lever 112 is rotated counter-clockwise, as viewed in Figure 3, by the spring 117 when the flange 109 moves downwardly as plunger member 64 descends following a printing stroke thereof. Thus, after each printing stroke, the feed roller 41 is rotated counter-clockwise, as viewed in Figure 3, by the action of the pawl 118 on the ratchet wheel 119, advancing the tape to its proper position for a succeeding printing stroke of the plunger member 64.

The lever 113 is biased clockwise, as viewed in Figure 3, by a spring 120 connecting the end of the lever to a subjacent stationary portion of the supporting block 62. The end of the lever 113 is formed with an upwardly extendng projection 121 engageable with the abutment portion 122 of the contact arm of a normally closed reset switch 123 which is opened at the same time as the plunger element 63 is released, whereby the electrical components of the printing mechanism are released as soon as printing occurs and are reset to their normal conditions in readiness for a succeeding signal.

Figure 14:
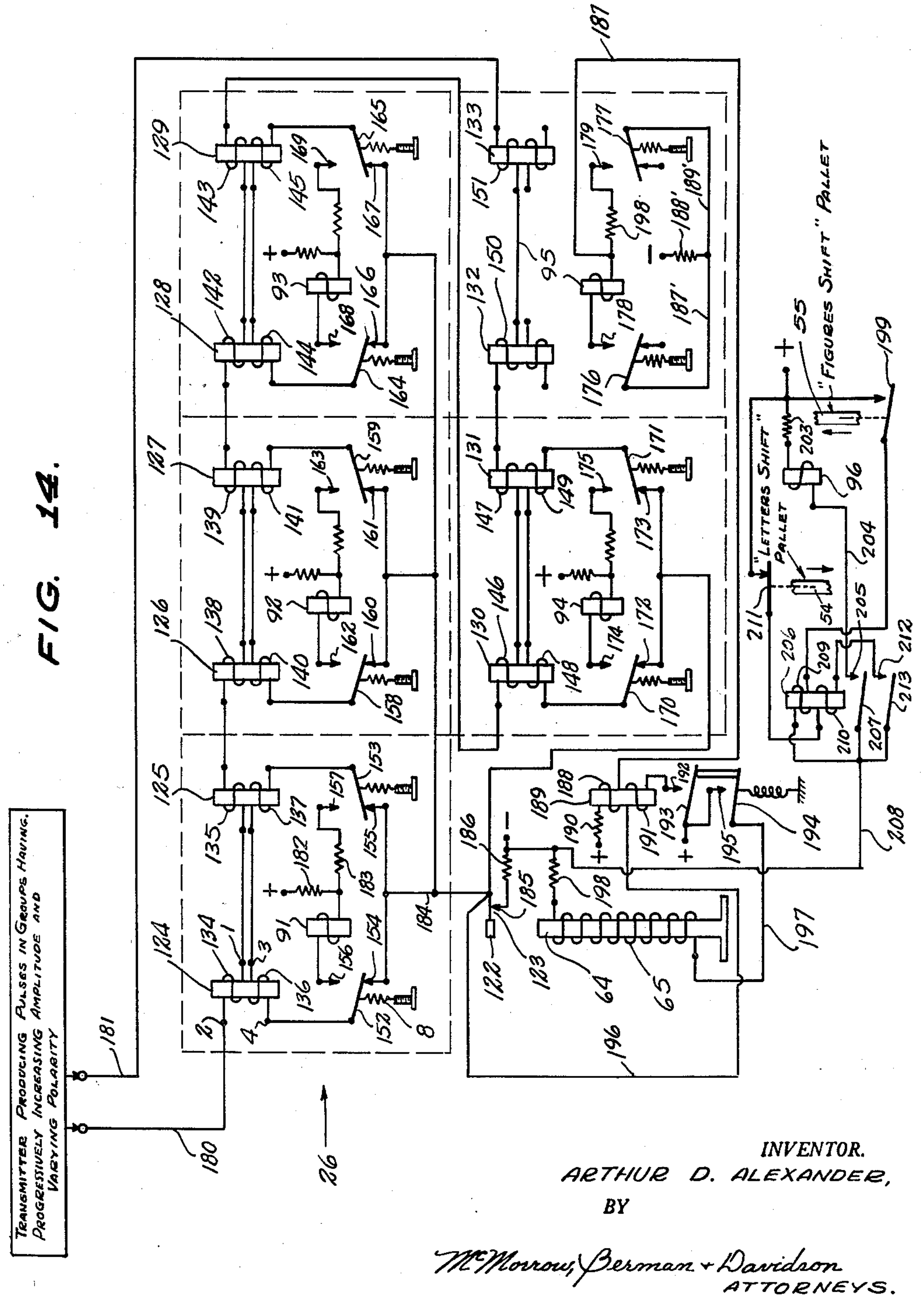
Figure 14 is a schematic wiring diagram showing the electrical connections of the receiving mechanism employed in the system of the present invention and illustrated in Figures 1 to 6.

Referring now to Figure 14, it will be seen that each of the electromagnets 91 to 94 is controlled by a pair of polarized relays shown at 124, 125 for electromagnet 91, 126, 127 for electromagnet 92, 128, 129 for electromagnet 93, and 130, 131 for electromagnet 94. The electromagnet 95 is controlled by a pair of relays 132 and 133 which operate in a manner presently to be described. Relays 124 and 125 have current-responsive windings 134 and 135 and locking windings 136 and 137, as shown in Figure 14. Relays 126 and 127 have current-responsive windings 138 and 139 and locking windings 140 and 141. Relays 128 and 129 have current-responsive windings 142 and 143 and locking windings 144 and 145. Relays 130 and 131 have current-responsive windings 146 and 147 and locking windings 148 and 149. The relays 132 and 133 have current-responsive windings 150 and 151.

Relays 124 and 125 have the respective armatures 152 and 153 biased downwardly toward engagement with respective stationary contacts 154 and 155 and being movable upwardly responsive to the energization of the associated relay into contact with the respective stationary contacts 156 and 157. Similarly, relays 126 and 127 have the armatures 158 and 159 normally engaging stationary contacts 160 and 161 and being movable upwardly to engage respective upper contacts 162 and 163. Relays 128 and 129 have the respective armatures 164 and 165 normally engaging lower contacts 166 and 167 and movable into engagement with upper contacts 168 and 169 responsive to energization of the relays. Relays 130 and 131 have the armatures 170 and 171 normally engaging the lower contacts 172 and 173 and engageable with upper contacts 174 and 175 responsive to the energization of the associated relays. Relays 132 and 133 have their respective armatures 176 and 177 which are movable upwardly responsive to energization of the windings 150 and 151 to engage respective upper contacts 178 and 179. The windings 134 and 135 are effective to energize their associated relays and elevate their associated armatures 152 and 153 whenever a respective pulse of a minimum magnitude in the pulse series, for example, a pulse having the magnitude shown in Figure 13 for the pulse 21, is received. However, the relays 124 and 125 are so arranged, as by the provision of permanently magnetized poles acting on the armatures 152 and 153, that the relays will only respond to a pulse of one polarity. Thus, if a positive pulse 21 is received by the windings of relays 124 and 125, only the windings 134 will be effective, and only the armature 152 will rise. Similarly if a negative pulse of the magnitude of pulse 21 is received, only the winding 135 will be effective, and only the armature 153 will rise. The windings 138 and 139 of the relays 126 and 127 are similar with respect to polar response as relays 124 and 125, but require a greater pulse magnitude for operation than the windings 134 and 135, for example, a pulse magnitude twice that required for energization of the relays 124 and 125, such as a pulse having the magnitude of pulse 22 in Figure 13. The windings 142 and 143 of the relays 128 and 129 require a still greater pulse magnitude for energization of the associated relays 128 and 129, for example, a pulse having a magnitude three times the magnitude of the initial pulse 21, such as the magnitude of pulse 23 in Figure 13. The windings 146 and 147 of the relays 130 and 131 require a still greater pulse magnitude for energization, for example a pulse magnitude four times that of pulse 21, namely, the magnitude of the pulse 24 shown in Figure 13. The windings 150 and 151 of the relays 132 and 133 require a still greater pulse magnitude for energization, for example, a pulse magnitude five times that of the initial pulse, for example, a magnitude such as that of the pulse 25 in Figure 13.

The polar characteristics of the relays associated with the first four pulses are similar, and in each stage, one of the relays responds to a positive pulse and the other responds to a negative pulse, as above described. The relays 132 and 133 in the fifth stage of the apparatus are similar in polar response to the relays of the first four stages, the winding 150 responding only to a pulse of positive polarity and the winding 151 responding only to a pulse of negative polarity, assuming the pulses to be represented in the manner shown in Figure 13 wherein pulses shown above a median line 10 are positive and below said median line are negative.

As shown in Figure 14, the respective opposing polar relay windings 134, 135 of the first stage, 138, 139 of the second stage, 142, 143 of the third stage, 146, 147 of the fourth stage, and 150, 151 of the fifth stage are connected in series between the signal input lines 180 and 181. The holding windings 136 and 137 of relays 124 and 125 are connected in series between the armatures 152 and 153. Upper contact 156 is connected through the winding of the electromagnet 91 and through a current limiting resistor 182 to the positive terminal of a suitable D.C. current source. The contact 157 is connected through a resistor 183 substantially the same in value as the D.C. resistance of the winding of electromagnet 91, and through the resistor 182 to the positive terminal of the current source. Lower contacts 154 and 155 are connected to a common conductor 184 which is in turn connected to the resilient contact arm of the reset switch 123. This contact arm normally engages a stationary contact 185 which is connected through a current limiting resistor 186 to the negative terminal of the current source. Lower contacts 160, 161 in the second stage, lower contacts 166, 167 in the third stage, and lower contacts 172, 173 in the fourth stage are each connected to the common conductor 184 and normally through contact 185 and resistor 186 to the negative terminal of the current source. Armatures 176 and 177 are connected through a resistor 188' by respective conductors 187' and 189' to the negative terminal of the current source.

The holding windings 136, 137 of the first stage, 140, 141 of the second stage, 144, 145 of the third stage, and 148, 149 of the fourth stage provide a relatively high magnetizing force when energized by the elevation of their associated armatures so that the respective relays, when once energized by their holding windings are locked thereby and cannot be affected by signal pulses passing through their other windings. Thus, when a positive pulse such as the pulse 21 is applied to the circuit connected to the conductors 180 and 181, the current responsive winding 134 energizes the relay 124 and raises the armature 152, connecting the electromagnet 91 in series with the holding winding 136 between the positive and negative terminals of the current source by a circuit comprising the positive terminal of the current source, resistor 182, the winding of electromagnet 91, contact 156, armature 152, holding winding 136, winding 137, armature 153, contact 155, wire 184, the contact arm of switch 123, contact 185, resistor 186 and the negative terminal of the current source. Holding winding 136 locks armature 152 in the raised position and holding winding 137 locks armature 153 in the lowered position, since winding 137 is wound opposite to winding 136 and the relay is provided with permanently magnetized pole pieces acting on the armature 153 which coact with the winding 137 in accordance with the direction of the current through said winding. If the initial pulse was negative in polarity, armature 153 would have been elevated and armature 152 would have been locked in lowered position, since the effect of the holding windings 136 and 137 is to lock the armatures in whichever position they happen to be at the time that current is applied through said holding windings..

In a similar manner, the winding of the magnet 92 becomes energized when armature 158 is raised, responsive to the reception of a positive pulse of twice the magnitude of pulse 21, namely, a pulse such as the pulse 22, but of positive polarity, is received in the winding 138. A negative pulse, such as pulse 22, would cause the armature 159 to be elevated, and would energize the locking windings 140 and 141 to lock armature 159 in elevated position and armature 158 in lowered position. If a positive pulse of correct magnitude is received by relay 138, electromagnet 92 becomes energized, since this connects the winding of the electromagnet between the positive terminal of the current source and the negative wire 184 to the lowered armature 159 and the contact 161.

Similarly, in the third stage, a positive pulse of sufficient magnitude, such as the pulse 23 in Figure 13, will energize the electromagnet 93 and lock the relays so as to maintain the electromagnet 93 energized as long as the holding windings 144 and 145 are held energized, namely, as long as the resilient arm of reset switch 123 engages the stationary contact 185. In the same manner, a negative pulse will lock the electromagnet 93 in a deenergized condition. In the fourth stage the electromagnet 94 will be locked in an energized condition by the reception of a positive pulse of sufficient magnitude, for example, of four times the magnitude of pulse 21, such as the magnitude of the pulse 24 in Figure 13. A negative pulse of this magnitude will lock the electromagnet 94 in a deenergized condition, since it will lock the armature 171 in its elevated position and the armature 170 in its lowered position as long as the holding windings 148 and 149 are energized.

The windings 150 or 151 will become energized when a fifth pulse is received of greater magnitude than the fourth pulse, for example, a pulse of the magnitude of the pulse 25 of Figure 13, which is five times the magnitude of the pulse 21, a positive pulse being effective to energize the winding 150 and a negative pulse being effective to energize the winding 151. When a positive pulse of sufficient magnitude, such as the pulse 25, is received in the relay winding 150, the armature 176 is elevated. The electromagnet 95 has its winding connected between the upper contact 178 of relay 132 and a wire 187, said wire 187 being connected to one terminal of a winding 188 of a double wound relay 189. The other terminal of the winding 188 is connected through a resistor 190 to the positive terminal of the current source. The relay 189 has a holding winding 191 having one terminal thereof connected to a contact 192 of the relay which is engageable by a relay armature 193. The armature 193 is connected to the positive terminal of the current source. A second relay armature 194 is engageable with a second upper contact 195 of relay 189, said contact 195 being connected to the positive terminal of the current source.

The holding winding 191 is connected between the contact 192 and a wire 196, which is connected to the negative wire 184. Armature 194 is connected by a wire 197 to one terminal of the solenoid 65. The other terminal of the solenoid is connected through a suitable current limiting resistor 198 to the negative terminal of the current source.

When the fifth pulse is applied to windings 150 and 151, either of the relays 132 or 133 will become energized, depending upon the polarity of the fifth pulse. If the pulse is positive, armature 176 is elevated, energizing the electromagnet 95 by a circuit from the negative terminal of the current source, through resistor 188', wire 187', armature 176, contact 178, the winding of electromagnet 95, wire 187, relay winding 188, resistor 190 and the positive terminal of the current source. This raises armature 193 and energizes the holding winding 191 through a circuit from the positive terminal of the current source, armature 193, contact 192, the winding 191, wire 196 and the negative wire 184, connected to the negative terminal of the current source through the reset switch 123.

Relay winding 188 also becomes energized if the fifth pulse is negative in polarity, since a negative fifth pulse energizes relay 133 and raises armature 177 into contact with the stationary contact 179, whereby the negative terminal of the current source is connected through resistor 188', wire 189', armature 177, contact 179, a compensating resistor 198 having substantially the same D.C. resistance as the winding of the electromagnet 95, wire 187, winding 188, resistor 190 and positive terminal of the current source. Thus, a fifth pulse of either polarity energizes the relay 189 and also causes the solenoid 65 to become energized by a circuit from the positive terminal of the current source, through contact 195, wire 197, the solenoid winding, resistor 198 and the negative terminal of the current source, the solenoid 65 remaining energized as long as the relay 189 remains energized. However, when the solenoid plunger 64 rises sufficiently, the reset element 122 is engaged, as above described, opening reset switch 123 and opening the holding circuit of the relay 189. Thus, the holding winding 191 is deenergized when reset switch 123 opens, because it is disconnected from the contact 185 which leads to the negative terminal of the current source. When reset switch 123 opens, the holding windings of the respective pulse-responsive relay stages are deenergized, releasing the polarized relays 124, 125, 126, 127, 128, 129, 130 and 131, and also, such magnets 91 to 95 as were previously energized become deenergized, since the opening of the reset switch 123 disconnects wire 184 from the negative terminal of the current source.

From the above it will be seen that a specific combination of pulses having the successively increasing magnitudes, such as shown in Figure 13, and having a particular polarity arrangement, will produce a specific pattern of energization of the respective electromagnets 91 to 95, whereby the associated disc members 78 to 82 will be rotated accordingly, and whereby a pallet arm 46 will be released for movement to printing position when the flange 66 rises with plunger member 64 responsive to the energization of solenoid 65.

Figures 1, 7, 8, 9:
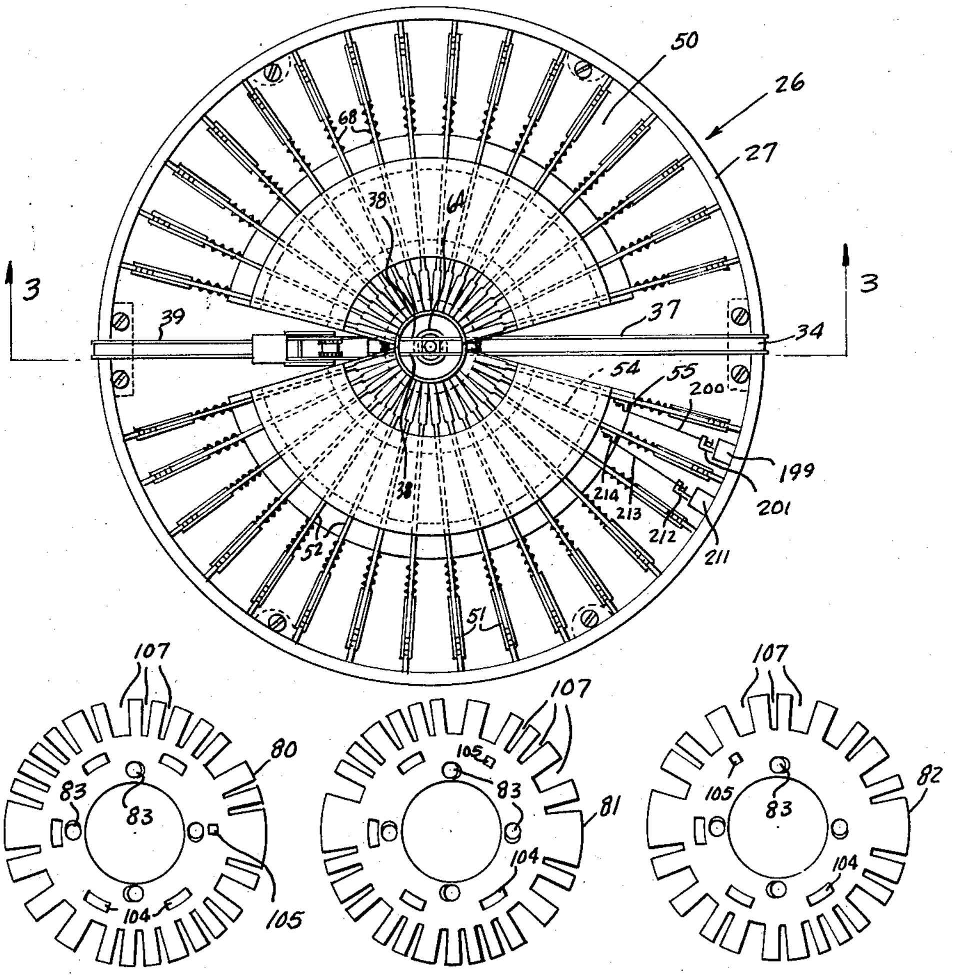
Figure 1 is a top plan view of a receiving apparatus employed in a printing teletypewriter system according to the present invention.
Figure 7 is a plan view of the uppermost disc member employed in the receiver of Figures 1 to 6.
Figure 8 is a plan view of the second disc member employed in the receiver of Figures 1 to 6.
Figure 9 is a plan view of the third disc member employed in the receiver of Figures 1 to 6.

To transmit numbers rather than letters, a specific pulse or coding arrangement is employed for rotating the "figure shift" disc member 86 from its normal position to its "figure shift" position, which is accomplished by energizing the sixth electromagnet 96. A pallet arm associated with a pallet bar 55, shown in Figure 1, is selected to cause energization of the "figure shift" electromagnet 96. Thus, a normally open switch 199 may be mounted on the wall of cylindrical housing 27 adjacent the pallet member 55 and may be mechanically connected to said pallet member 55 by a cable or wire 200 which slidably engages the switch-opening arm 201. When the pallet arm associated with the pallet member 55 is selected, whereby the pallet member 55 is moved inwardly by the entrance of the selected pallet arm in a set of vertically registering notches in the peripheries of the disc members 78 to 82, the switch 199 is closed by the action of the connecting cable 200 on its operating plunger 201. As shown in Figure 14, the winding of the electromagnet 96 has one terminal thereof connected through a suitable resistor 203 to the positive terminal of the current source. The remaining terminal of the winding of electromagnet 96 is connected to a wire 204 through one of the contacts 205 of a double wound relay 206. The armature 207 of relay 206 is connected by a wire 208 to the negative terminal of the current source. Relay 206 has a first winding 209 which is connected between wire 208 and the positive terminal of the current source through the normally open switch 199. Relay 206 also has a holding winding 210. One terminal of winding 210 is connected through a normally closed switch 211 to the positive terminal of the current source. The remaining terminal of winding 210 is connected to a stationary contact 212 thereof which is engageable by an armature 213 of the relay when the relay is energized. Armature 213 is connected to the negative wire 208. When winding 209 becomes energized, as by the closure of the switch 199, produced by the selection of the pallet member 55, as above described, the holding winding 210 becomes energized by a circuit from the positive terminal of the current source, through the normally closed switch 211, the winding 210, the contact 212, the armature 213, and the wire 208 to the negative terminal of the current source. This locks the disc member 86 in "figure shift" position, since the electromagnet 96 is held energized as long as relay 206 remains energized, even if switch 199 thereafter opens, as when figure information is transmitted, and as long as switch 211 remains closed.

As shown in Figure 1, the switch 211 is mounted on the cylindrical wall 27 adjacent the "letters shift" pallet member 54, which may be selected for inward movement by a suitable polarity combination of the pulses, in a manner akin to that employed for the selection of the "figure shift" pallet member 55. The pallet member 54 is connected to the switch-opening plunger element 212 of switch 211 by suitable cable or wire 213, whereby the switch 211 is opened responsive to the inward movement of the pallet member 54 resulting from the selection thereof.

When switch 211 opens, the holding winding 210 of double wound relay 206 is deenergized, causing the armatures 207 and 213 to drop, and causing the "figure shift" electromagnet 96 to become deenergized by the disengagement of armature 207 from contact 205. The spring 106 associated with the depending arm 102 of the lever 99 associated with electromagnet 96 then causes the "figure shift" disc member 86 to return to its normal position, limiting inward movement of the pallet arms 46 in the manner above described, whereby letters, rather than numbers, are selected for printing.

A "space" pallet member 214 is provided adjacent to the pallet members 54 and 55, said "space" pallet member 214 being connected to a respective pallet arm which may be selected in the same manner as the pallet arms associated with the pallet members 54 and 55. The "space" pallet member 214 is blank at its printing end, whereby a blank space will appear in the tape corresponding to the selection of the "space" pallet member, and corresponding to the reception of a suitable polarity combination of the pulses 21 to 25 designated for a "space."

Figures 6, 16:
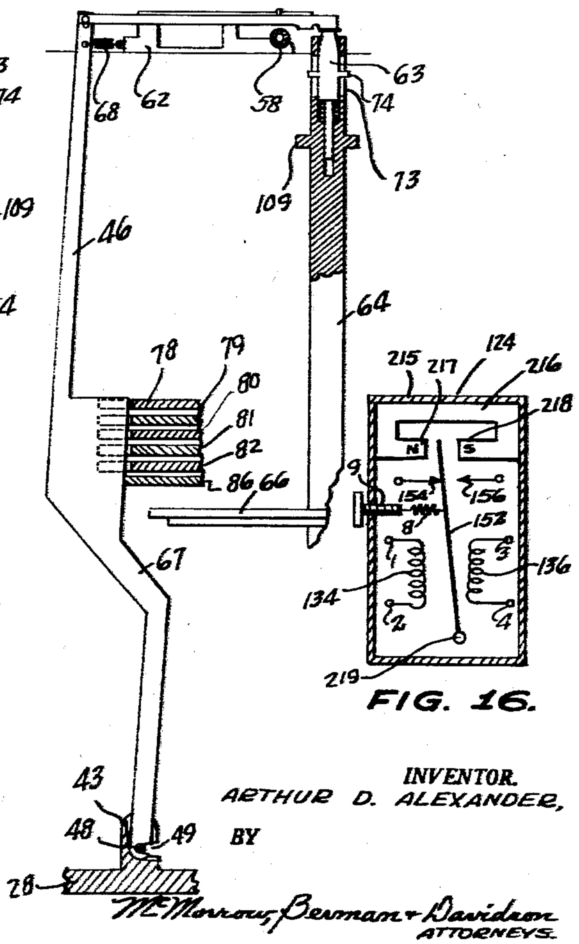
Figure 6 is a fragmentary view, similar to Figure 5, but showing the pivoted pallet arm engaged in the registering notches simultaneously with the printing stroke of the mechanism.
Figure 16 is a diagrammatic view illustrating the general structure of one of the polarized relays employed in the system of the present invention.

Figure 16 schematically illustrates one of the ten relay devices employed in the five pulse-responsive stages of a receiving apparatus. Thus, for example, the relay device 124 is schematically illustrated, and is of the same construction as the other nine relay devices. The relay device 124 comprises a suitable non-magnetic housing 215 in which is mounted a permanent magnet 216 having north and south poles 217 and 218 between which is received the upper end portion of the armature 152, of magnetic material, pivoted in the housing at 219. A biasing spring 8 is connected between armature 152 and the end of a tension-adjusting screw 9, whereby the biasing force on the armature may be adjusted in accordance with the magnitude of the pulse desired to actuate the armature. The operating winding 134 has the terminals 1 and 2 and the holding winding 136 has the terminals 3 and 4. Normally, as shown, armature 152 is biased into engagement with contact 154 and has its free end disposed adjacent to the north pole 217 of permanent magnet 216. The operating winding 134 and the locking winding 136 are wound in such a manner as to induce an electromagnetic polarity on the armature 152 when current flows through either of the windings. When current of a required magnitude to overcome the tension of spring 8 flows in the operating winding 134 in a direction from terminal 1 to terminal 2, the armature 152 is attracted to the south pole 218. This causes the armature 152 to disengage from contact 154 and engage with contact 156. When current flows in the operating winding 134 from terminal 2 to terminal 1, the armature 152 is attracted to the north pole 217 and remains in engagement with contact 154. When current flows in the locking winding 136 in a direction from terminal 3 to terminal 4, the armature 152 is attracted to the south pole 218 and engages contact 156. When current flows in the locking winding 136 in a direction from terminal 4 to terminal 3, the armature is attracted to the north pole 217 and contact 154. As will be readily apparent, current must flow through the relay windings in a definite direction and have a specific magnitude before the relay will operate. Thus, a positive pulse applied to winding 134 will cause current to flow from terminal 1 to terminal 2 and swing armature 152 into engagement with contact 156. From the circuit of Figure 14, this connects the terminal 4 of holding winding 136 to the positive terminal of the potential source, whereby current will flow through the holding winding 136 in the proper direction to cause armature 152 to be attracted by the south pole 118 and to hold the armature in engagement with the contact 156. At the same time, the current flowing in the operating winding 135 of the complementary relay device 125 is in a direction to urge its armature 153 toward the contact 155 and the current flowing in the holding winding 137 is in the proper direction to hold the armature 153 in this same position, namely, in engagement with the contact 155. The holding windings 136 and 137 will prevent any change in position of the respective armatures 152 and 153 during the subsequent pulses of the pulse series and will maintain the armatures 152 and 153 in their established positions until the reset switch 123 is opened at the end of the pulse series, as above explained.

The remaining polarized relays are the same in construction as the relay 124 except that the holding windings of relays 132 and 133 are not used.

The most outstanding advantage offered by the system of the present invention as compared to systems of the prior art, such as conventional teletypewriter systems, Morse code systems, and picture telegraphy systems is that in the system of the present invention there are less signal elements required to transmit a given amount of intelligence. This means that the system of the present invention offers greater telegraph speeds at a given frequency assignment (more intelligence per unit of time), or that an equal amount of intelligence may be transmitted at a lower frequency assignment. Since both of these factors directly affect the cost of a communication channel, the system of the present invention is more economical than the systems heretofore employed. The system of the present invention is also more efficient than the systems previously employed in the art, since a greater number of communication circuits may be imposed on a given communication channel, by making better use of the frequency spectrum.

Another advantage offered by the system of the present invention as compared to a teletypewriter system and a picture telegraphy system, as previously employed, is that the groups of coded pulses need not be supplemented with additional pulses such as "start-stop" pulses or other additional pulses to maintain synchronizaztion between the coding members in the transmitter and the decoding members in the receiver. In previously employed systems, a complete teletypewriter code group always includes a start impulse and a stop impulse. This is known as the "start-stop" system to maintain synchronization. Early teleprinter systems, such as the "Siemens-Hell" system did not employ the "start-stop" feature, but employed double printing of each character transmitted. If one character could not be read, the other one usually could be. In the system of the present invention, neither "start-stop" impulses nor double printing is necessary.

A novel feature of the system of the present invention is that the individual signal elements of a code group progressively increase in amplitude and are arranged in polarity according to the character transmitted. Teletypewriters of the conventional type, Morse code printers, and Siemens-Hell teleprinters are not capable of receiving signals of this type.

Another novel feature of the system of the present invention is that the individual code elements of a particular group of coded pulses may be received either as a single pulse or as a series of pulses without filtering or otherwise changing the pulses before they affect the automatic selecting and decoding members related with organizing the receiver to print the character associated with a received group of pulses. In other words, a pulse carrying the intelligence of a single code element may be repeated during the transmission of a group without adversely affecting the printed character associated with that particular group of pulses. The repetition of a code element while transmitting a particular group of coded pulses is not possible in a conventional teletypewriter system, a Morse code system, or a picture telegraphy system. The repeated pulse would be mistaken for the next code element.

Another advantage offered by the system of the present invention is that there is a shorter selecting interval in the receiver than in systems previously employed in the art. In the system of the present invention, the components associated with the selection of a code element are activated when the required amplitude of the pulse representing that code element is obtained. In systems of the prior art the pulse must not only obtain a specific effective amplitude, but the pulse must remain at the effective amplitude for a considerable length of time due to the fact that the selecting components of the devices of the prior art are timed with the incoming pulses by a device such as a motor within the receiver. Therefore, there must be a certain margin for error in timing.

A still further advantage of the system of the present invention as over systems of the prior art is that selection according to the system of this invention does not depend on the relative lengths and locations of the individual signal elements of a group of coded pulses. In all telegraphy systems previously employed in the art, the quality of the received signals is determined by the relative lengths and locations of the signal elements measured after they are repeated through a receiving relay or after actuating the magnet of a receiving device, compared with the lengths and locations of the signal elements impressed at the sending end. A measurement of received telegraph signal quality does not include a measurement of the amplitude or strength of the received signal, but only on the time during which the signal is of sufficient strength to operate the receiving device. In this respect, the system of the present invention will tolerate a much greater amount of distortion than systems previously employed in the art due to the fact that the intelligence is not in the timing.

A still further advantage offered by the system of the present invention is that the transmitter components, while producing the groups of coded pulses, and the receiver components related to the reception and decoding of said groups of coded pulses, need not be driven by a special timing device such as a motor, an oscillator, a vibrator, or other similar device having regular controlled movement or output to maintain synchronization by keeping coding and decoding members at the same speed. In the system of the present invention, the components are not timed by a device in the receiver, but are actuated at the speed at which the signals are transmitted. The signals may be transmitted at an irregular speed, as in manual transmission, or at regular speed, either fast or slow, and still activate their related selecting components for proper reception.

Another novel feature of the system of the present invention is that the receiving device has circuits capable of storing the intelligence of the coded pulses, and wherein said circuits associated with the storing of the intelligence contained in the last pulse are further arranged to automatically activate circuits associated with printing the character associated with the stored group of coded pulses.

A still further novel feature provided by the system of the present invention is that the receiving device has respective circuits immune to pulses of less amplitude than their intended pulses and said circuits are rendered immune to pulses of greater amplitude after having been activated by said pulses.

Another advantage of the system of the present invention, as compared to systems of the prior art, is that the receiving device has printing means consisting of embossed type members which are automatically inked by a roller individually upon selection. In conventional teletypewriter receivers of the prior art, several different facilities are provided for inking the printing members. The most common means employed is a ribbon impregnated with ink, as in a typewriter. Type pallets having embossed type, and type wheels are both used in conjunction with ribbons. The disadvantage of using a ribbon is that additional features must be added to feed the ribbon during printing, to reverse the ribbon after it has been unwound from one spool onto the other, and to oscillate the ribbon up and down in a page printer so that the printed copy can be read immediately after printing. These functions are automatic in teletypewriters, but they tend to make the device more complex and more expensive. Ink rollers have proved to be practical in devices using type wheels, but ink rollers have not been used in conjunction with type pallets. The type pallet movement is such that in order to utilize an ink roller for the inking of the embossed surface prior to printing, a means must be provided to move the ink roller across the surface of the type pallet, and back out of the path of movement of the type pallet so that it could pivot freely toward the surface to be printed on. The mechanism involved in accomplishing this is more impractical than the known mechanisms designed to perform ribbon feeding, ribbon reverse, and ribbon oscillation. Therefore, ink rollers have not been used in conjunction with type pallets. In the system of the present invention, the type pallets move in a direction parallel to the surface of the embossed portion instead of perpendicular to the surface, thus making it practical to use ink rollers in conjunction therewith. The type pallets merely slide across the respective ink rollers, causing a deposit of ink to be placed on their embossed printing surface prior to printing. The method employed in the present invention is even more practical than the type wheel method, because in the method of the present invention, only the member which is to effect printing is inked. On the other hand, in a type wheel system, all members come in contact with the ink roller. The ink rollers not only become dried out more quickly and need replacement more often, but also the excessive inking of the printing members causes the type wheel to become clogged and filled up with ink pigment and causes fragments to be worn off the ink roller. In the system of the present invention, only the member which is to effect printing is inked, resulting in conservation of ink, less wear and tear on the ink rollers, and less maintenance due to clogged and dirty type members.

A still further advantage offered by the system of the present invention is that the ink rollers in the receiver associated with the automatic inking of the printing members are provided with a support which is shaped to hold several ink rollers in a position to cause a deposit of ink to be placed on the respective printing members prior to each printing function, and wherein said support is apertured in a manner to distribute ink to all rollers associated with said support, wherein the ink rollers are resaturated with ink as they are expended for printing. Teletypewriter receivers of the prior art, as presently employed, using ink rollers do not have provision for the resaturation of said ink rollers. After the ink has been expended or dried out, the ink rollers are discarded and replaced with new rollers.

While a specific embodiment of an improved method and means for teletypwriter communication has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a system of communication employing a series of electrical pulses of progressively increasing magnitude and of varying polarity arrangement to represent different characters, a receiver comprising a plurality of movable members, each associated with a respective character, a plurality of coaxially mounted, rotatable peripherally notched members engaging said movable members and having notches registrable to release a selected movable member, respective electromagnets controlling the rotation of said notched members, and means controlling the energization of said electromagnets in accordance with the polarity arrangement of the electrical pulses.

2. In a system of communication employing a series of electrical pulses of progressively increasing amplitude and of varying polarity arrangement to represent different characters, a printing receiver comprising a support, a plurality of coaxial spaced disc members rotatably mounted on said support, each disc member being formed with spaced notches at its periphery, certain of said notches being registrable to correspond to a selected character and such registration being the result of relative rotation of selected disc members, pallet arms pivoted to the support, respective pallets connected to said arms and being movable therewith to a printing position, said arms being associated with the respective characters and being at times engageable with the peripheral edges of the disc members, whereby movement of the pallet arms to printing positions is limited by such engagement in the absence of registration of the notches adjacent the printing arms, whereby a pallet arm will be selected when the disc notches adjacent thereto are in registration, respective electromagnets associated with the disc members, each electromagnet having a movable armature, means operatively coupling the armatures to the respective disc members, whereby to control the rotation of said disc members in accordance with the energization of the electromagnet, and means to selectively energize said electromagnets in accordance with the polarity arrangement of the respective series of electrical pulses.

3. In a system of communication employing a series of electrical pulses of progressively increasing amplitude and of varying polarity arrangement to represent different characters, a printing receiver comprising a support, a plurality of coaxial spaced disc members rotatably mounted on said support, each disc member being formed with spaced notches at its periphery, certain of said notches being registrable to correspond to a selected character and such registration being the result of relative rotation of selected disc members, pallet arms pivoted to the support, respective pallets connected to said arms and being movable therewith to a printing position, said arms being associated with the respective characters and being at times engageable with the peripheral edges of the disc members, whereby movement of the pallet arms to printing position is limited by such engagement in the absence of registration of the notches adjacent the pallet arms, whereby a pallet arm will be selected when the disc notches adjacent thereto are in registration, respective electromagnets associated with the disc members, each electromagnet having a movable armature, means operatively coupling the armatures to the respective disc members, whereby to control the rotation of said disc members in accordance with the energization of the electromagnet, and means to selectively energize said electromagnets in accordance with the polarity arrangement of the respective series of electrical pulses, a printable recording member mounted adjacent said printing position, and means moving the printable member into printing engagement with the selected pallet responsive to the last pulse of the associated series of pulses.

4. In a system of communication employing a series of electrical pulses of progressively increasing amplitude and of varying polarity arrangement to represent different characters, a printing receiver comprising a support, a plurality of coaxial spaced disc members rotatably mounted on said support, each disc member being formed with spaced notches at its periphery, certain of said notches being registrable to correspond to a selected character and such registration being the result of relative rotation of selected disc members, pallet arms pivoted to the support, respective pallet connected to said arms and being movable therewith to a printing position, said arms being associated with the respective characters and being at times engageable with the peripheral edges of the disc members, whereby movement of the pallet arms to printing position is limited by such engagement in the absence of registration of the notches adjacent the pallet arms, whereby a pallet arm will be selected when the disc notches adjacent thereto are in registration, respective electromagnets associated with the disc members, each electromagnet having a movable armature, means operatively coupling the armatures to the respective disc members, whereby to control the rotation of said disc members in accordance with the energization of the electromagnet, means to selectively energize said electromagnets in accordance with the polarity arrangement of the respective series of electrical pulses, a printable recording tape mounted over said printing position, means moving the recording tape into pallet engagement with the selected printing responsive to the last pulse of the associated series, and means returning said pallet arm to non-printing position and simultaneously advancing the tape at the end of the series of pulses.

5. In a system of communication employing a series of electrical pulses of progressively increasing amplitude and of varying polarity arrangement to represent different characters, a printing receiver comprising a support, a plurality of coaxial spaced disc members rotatably mounted on said support, each disc member being formed with spaced notches at its periphery, certain of said notches being registrable to correspond to a selected character and such registration being the result of relative rotation of selected disc members, pallet arms pivoted to the support, said arms being associated with the respective characters, respective pallets connected to said arms and being movable therewith to a printing position, means moving said pallet arms into engagement with the peripheral edges of the disc members responsive to the reception of a series of said pulses, the movement of the pallet arms to printing position being limited by such engagement in the absence of registration of the notches adjacent the pallet arms, whereby a pallet arm will be selected when the notches adjacent thereto are in registration, respective electromagnets associated with the disc members, each electromagnet having a movable armature, means operatively coupling the armatures to the respective disc members, whereby to control the rotation of said disc members in accordance with the energization of the electromagnets, means to selectively energize said electromagnets in accordance with the polarity arrangement of the respective series of electrical pulses, a printable recording member mounted adjacent said printing position, and means moving the printable member into printing engagement with the selected pallet responsive to the last pulse of the associated series.

6. In a system of communication employing a series of electrical pulses of progressively increasing amplitude and of varying polarity arrangement to represent different characters, a printing receiver comprising a support, a plurality of coaxial spaced disc members rotatably mounted on said support, each disc member being formed with spaced notches at its periphery, certain of said notches being registrable to correspond to a selected character and such registration being the result of relative rotation of selected disc members, pallet arms pivoted to the support, respective pallets connected to said arms and being movable therewith to a printing position, said arms being associated with the respective characters, means moving said pallet arms into engagement with the peripheral edges of the disc members responsive to the reception of a series of said pulses, the movement of the pallet arms to printing position being limited by such engagement in the absence of registration of the notches adjacent the pallet arms, whereby a pallet arm will be selected when the notches adjacent thereto are in registration, respective electromagnets associated with the disc members, each electromagnet having a movable armature, means operatively coupling the armatures to the respective disc members, whereby to control the rotation of said disc members in accordance with the energization of the electromagnets, means to selectively energize said electromagnets in accordance with the polarity arrangement of the respective series of electrical pulses, a printable recording tape mounted over said printing position, means moving the recording tape into printing engagement with the selected pallet responsive to the last pulse of the associated series, and means moving said pallet arms outwardly away from said peripheral edges of the disc members and simultaneously advancing the tape at the end of the series of pulses.

7. In a system of communication employing a series of electrical pulses of progressively increasing amplitude and of varying polarity arrangement to represent different characters, a printing receiver comprising a support, a plurality of coaxial spaced disc members rotatably mounted on said support independently of each other, each disc member being formed with spaced notches at its periphery, certain of said notches being registrable to correspond to a selected character and such registration being obtained by relative rotation of selected disc members to predetermined positions, pallet arms pivoted to the support and being associated with the respective characters, respective pallets connected to said arms and being movable therewith to a printing position, means moving said pallet arms toward the axis of the disc members and into engagement with the peripheral edges of the disc members responsive to the reception of a complete series of said pulses, the movement of the pallet arms to pallet position being limited by such engagement in the absence of registration of the notches adjacent the pallet arms, whereby a pallet arm will be selected when the notches adjacent thereto are in registration, respective electromagnets associated with the disc members, each electromagnet having a movable armature, means operatively coupling the armatures to the respective disc members, whereby to rotate the respective disc members in accordance with the energization of the electromagnets, respective energizing circuits connected to the electromagnets, each energizing circuit responding to a different pulse amplitude, said energizing circuits including means energizing each electromagnet in response to a positive pulse of effective amplitude received by its associated energizing circuit and means locking the electromagnets in energized or deenergized condition as the associated pulse is received by its energizing circuit, whereby the electromagnets are energized in accordance with the polarity arrangement of the respective series of electrical pulses, a printable recording member mounted adjacent said printing position, and means moving the printable member into printing engagement with the selected printing arm responsive to the last pulse of the associated series.

8. In a system of communication employing a series of electrical pulses of progressively increasing amplitude and of varying polarity arrangement to represent different characters, a printing receiver comprising a support, a plurality of coaxial spaced disc members rotatably mounted on said support independently of each other, each disc member being formed with spaced notches at its periphery, certain of said notches being registrable to correspond to a selected character and such registration being obtained by relative rotation of selected disc members to predetermined positions, pallet arms pivoted to the support and being associated with the respective characters, respective pallets connected to said arms and being movable therewith to a printing position, means moving said pallet arms toward the axis of the disc members and into engagement with the peripheral edges of the disc members responsive to the reception of a complete series of said pulses, the movement of the pallet arms to pallet position being limited by such engagement in the absence of registration of the notches adjacent the pallet arms, whereby a pallet arm will be selected when the notches adjacent thereto are in registration, respective electromagnets associated with the disc members, each electromagnet having a movable armature, means operatively coupling the armatures to the respective disc members, whereby to rotate the respective disc members in accordance with the energization of the electromagnetics, respective energizing circuits connected to the electromagnets, each energizing circuit responding to a different pulse amplitude, said energizing circuits including means energizing each electromagnet in response to a positive pulse of effective amplitude received by its associated energizing circuit, and means locking the electromagnets in energized or deenergized condition as the associated pulse is received by its energizing circuit, whereby the electromagnets are energized in accordance with the polarity arrangement of the respective series of electrical pulses, a printable recording tape mounted over said printing position, means moving the recording tape into printing engagement with the selected pallet responsive to the last pulse of the associated series, and means returning said selected pallet to non-printing position and simultaneously advancing the tape at the end of the series of pulses.

9. In a system of communication employing a series of electrical pulses of progressively increasing amplitude and of varying polarity arrangement to represent different characters, a printing receiver comprising a support, a plurality of coaxial spaced disc members rotatably mounted on said support independently of each other, each disc member being formed with spaced notches at its periphery, certain of said notches being registrable to correspond to a selected character and such registration being obtained by relative rotation of selected disc members to predetermined positions, pallet arms pivoted to the support and being associated with the respective characters, respective pallets connected to said arms and being movable therewith to a printing position, means moving said pallet arms toward the axis of the disc members and into engagement with the peripheral edges of the disc members responsive to the reception of a complete series of said pulses, the movement of the pallet arms to pallet position being limited by such engagement in the absence of registration of the notches adjacent the pallet arms, whereby a pallet arm will be selected when the notches adjacent thereto are in registration, respective electromagnets associated with the disc members, each electromagnet having a movable armature, means operatively coupling the armatures to the respective disc members, whereby to rotate the respective disc members in accordance with the energization of the electromagnetics, respective energizing circuits connected to the electromagnets, each energizing circuit responding to a different pulse amplitude, said energizing circuits including means energizing each electromagnet in response to a positive pulse of effective amplitude received by its associated energizing circuit and means locking the electromagnets in energized or deenergized condition as the associated pulse is received by its energizing circuit, whereby the electromagnets are energized in accordance with the polarity arrangement of the respective series of electrical pulses, a printable recording tape mounted over said printing position, means moving the recording tape into printing engagement with the selected pallet responsive to the last pulse of the associated series, and menas moving said pallet arms outwardly away from said peripheral edges of the disc members and simultaneously advancing the tape and releasing said locking means at the end of the series of pulses.

10. In an apparatus of the character described, a plurality of peripherally notched pallet control discs, means mounting said discs in parallel spaced relation on a common axis for independent rotation, respective electromagnets associated with the respective discs, means operatively coupling the electromagnets to the discs to rotate the discs through predetermined angles responsive to energization of the electromagnets, certain of the notches in the discs being moved into alignment responsive to rotation of certain of said discs through said predetermined angles, serially connected relays associated with the respective electromagnets, the successive relays being formed and arranged to be energized by respective signals of successively increased amplitude and of like polarity, one of the relays requiring maximum signal amplitude for its energization, respectively locking means associated with and being arranged to lock all but said last named relay in energized or deenergized condition responsive to said respective signals and in accordance with the polarity thereof, and circuit means formed and arranged to energize the respective electromagnets responsive to the energization of their associated respective relays.

11. In an apparatus of the character described, a plurality of peripherally notched pallet control discs, means mounting said discs in parallel spaced relation on a common axis for independent rotation, respective electromagnets associated with the respective discs, means operatively coupling the electromagnets to the discs to rotate the discs through predetermined angles responsive to energization of the electromagnets, certain of the notches in the discs being moved into alignment responsive to rotation of certain of said discs through said predetermined angles, serially connected relays associated with the respective electromagnets, the successive relays being formed and arranged to be energized by respective signals of successively increased amplitude and of like polarity, one of the relays requiring maximum signal amplitude for its energization, respective locking means associated with and being arranged to lock all but said last named relay in energized or deenergized condition responsive to said respective signals and in accordance with the polarity thereof, a circuit means formed and arranged to energize the respective electromagnets responsive to the energization of their associated relays, and means releasing said locking means and simultaneously deenergizing said relays and electromagnets responsive to the energization of said last named relay.

12. In an apparatus of the character described, a plurality of peripherally notched pallet control discs, means mounting said discs in parallel spaced relation on a common axis for independent rotation, respective electromagnets associated with the respective discs, means biasing said discs toward normal positions, means operatively coupling the electromagnets to the discs to rotate the discs through predetermined angles from said normal positions responsive to energization of the electromagnets, certain of the notches in the discs being moved into alignment responsive to rotation of certain of said discs through said predetermined angles, serially connected relays associated with the respective electromagnets, the successive relays being formed and arranged to be energized by respective signals of successively increased amplitude and of like polarity, one of the relays requiring maximum signal amplitude for its energization, respective locking means associated with and being arranged to lock all but said last named relay in energized or deenergized condition responsive to said respective signals and in accordance with the polarity thereof, circuit means formed and arranged to energize the respective electromagnets responsive to the energization of their associated relays, and means releasing said locking means and simultaneously deenergizing said relays and electromagnets responsive to the energization of said last named relay, whereby the discs will be returned by their biasing means to said normal positions.

References Cited in the file of this patent

UNITED STATES PATENTS

| | | |
|---|---|---|
| 2,082,924 | Watson | June 8, 1937 |
| 2,318,168 | Lang | May 4, 1943 |
| 2,321,922 | Leathers | June 15, 1943 |
| 2,490,048 | Gohorel | Dec. 6, 1949 |